(12) United States Patent
Johnson

(10) Patent No.: US 8,376,412 B2
(45) Date of Patent: Feb. 19, 2013

(54) ONE PIECE CONNECTION ASSEMBLY

(76) Inventor: Theodore D. Johnson, Clearwater, FL (US)

( * ) Notice: Subject to any disclaimer, the term of this patent is extended or adjusted under 35 U.S.C. 154(b) by 250 days.

(21) Appl. No.: 12/381,861

(22) Filed: Mar. 16, 2009

(65) Prior Publication Data

US 2010/0230961 A1 Sep. 16, 2010

(51) Int. Cl.
*F16L 17/00* (2006.01)
(52) U.S. Cl. ............ 285/336; 285/99; 285/352; 285/921
(58) Field of Classification Search .... 285/139.2–139.3, 285/305, 336, 352, 921, 99, 330, 913
See application file for complete search history.

(56) References Cited

U.S. PATENT DOCUMENTS

| | | | |
|---|---|---|---|
| 296,093 A | 4/1884 | Wells | |
| 508,448 A * | 11/1893 | Terlinden | 285/99 |
| 653,143 A * | 7/1900 | Martin | 285/67 |
| 700,798 A * | 5/1902 | Morris, Jr. | 285/70 |
| 724,324 A | 3/1903 | Parsons | |
| 882,497 A | 3/1908 | Gunnell | |
| 938,095 A | 10/1909 | Vlach | |
| 974,517 A | 11/1910 | Revaillot | |
| 1,377,472 A | 5/1921 | Gibson | |
| 1,611,286 A | 12/1926 | Shaff | |
| 2,132,506 A * | 10/1938 | Allen | 285/73 |
| 2,204,392 A | 6/1940 | Arm | |
| 2,250,199 A * | 7/1941 | Kelly | 285/99 |
| 2,816,779 A * | 12/1957 | Jensen | 285/74 |
| 3,201,151 A | 8/1965 | Westveer | |
| 3,700,269 A | 10/1972 | Salata | |
| 3,845,974 A * | 11/1974 | Pelloux-Gervais | 285/47 |
| 4,050,539 A | 9/1977 | Kashiwara | |
| 4,339,918 A | 7/1982 | Michikawa | |
| 4,502,701 A * | 3/1985 | Treloar et al. | 277/613 |
| 4,683,978 A | 8/1987 | Venter | |
| 4,792,014 A | 12/1988 | Shin-Seng | |
| 5,152,366 A | 10/1992 | Reitz | |
| 5,301,985 A | 4/1994 | Terzini | |
| 5,333,915 A | 8/1994 | Sparling et al. | |
| 5,383,691 A | 1/1995 | Anthony | |
| 5,568,946 A | 10/1996 | Jackowski | |
| 5,658,159 A | 8/1997 | Gardner et al. | |
| 5,779,277 A | 7/1998 | Street | |
| 5,831,223 A | 11/1998 | Kesselring | |
| 5,857,713 A | 1/1999 | Horimoto | |
| 6,102,450 A | 8/2000 | Harcourt | |
| 6,213,251 B1 | 4/2001 | Kesselring | |
| 6,302,447 B1 | 10/2001 | Lee | |
| 6,328,350 B1 | 12/2001 | Leonhardt | |
| 6,382,680 B1 | 5/2002 | Horimoto | |
| 6,629,707 B1 | 10/2003 | Yamaguchi et al. | |
| 6,679,351 B2 | 1/2004 | Cummings et al. | |
| 6,796,403 B1 | 9/2004 | Laughlin | |
| 6,889,500 B1 | 5/2005 | Martinez | |
| 7,086,498 B2 | 8/2006 | Choi | |
| 7,131,514 B2 | 11/2006 | Choi | |

(Continued)

*Primary Examiner* — Aaron Dunwoody
*Assistant Examiner* — Fannie Kee
(74) *Attorney, Agent, or Firm* — Ronald E. Smith; Smith & Hopen, P.A.

(57) ABSTRACT

Provided is a means for efficiently completing a high pressure seal and a connector assembly comprising two sealing members, each comprising an annular groove, and two elastomeric gasket members, each disposed into and fittingly received by the annular grooves of one of said sealing members, each gasket additionally comprising a sealing face not received into the annular grooves, wherein the sealing faces are in mutual aligned pressurized contact.

5 Claims, 4 Drawing Sheets

U.S. PATENT DOCUMENTS

| | | |
|---|---|---|
| 7,243,953 B2 | 7/2007 | Nakamura et al. |
| 7,263,961 B2 | 9/2007 | Now |
| 7,331,422 B2 | 2/2008 | Wall |
| 7,374,017 B2 | 5/2008 | Laughlin |
| 7,380,639 B2 | 6/2008 | Arlasky |
| 7,490,467 B2 | 2/2009 | Cummings |
| 2008/0093846 A1 | 4/2008 | Sparks et al. |
| 2008/0157523 A1 | 7/2008 | Woo |

* cited by examiner

ONE PIECE CONNECTION ASSEMBLY

BACKGROUND

The ease with which a connection can be made and broken is important in the ultimate usability of a connector technology. For example, screw-type connectors having threaded connections and deformable gaskets are strong, tight and can generally withstand high pressures. However, such connectors are labor-intensive to break and reform, and upon reformation, the quality of the reconnection is generally inferior to the quality of the original connection. Also presently on the market are flange-type connectors requiring an annular gasket for sealing. When functioning, the gasket is generally partially embedded in the surface of each flange. It is usually formed either entirely of an elastomeric material, or of a rigid plastic, with an additional layer of elastomeric or other deformable material at least partially overlying and adhering to the upper and/or lower annular surface of the gasket or the flange at the point of flange/gasket contact.

One problem with presently existing connection designs is their performance under high pressure and aseptic conditions. High-pressure conditions are frequently encountered in closed circulating systems, where pressures can be as high as 110 psi. Aseptic systems are frequently encountered in food science, food preparation, biological laboratories, as well as other applications. Connections presently on the market are susceptible to breach and leakage due to the failure of the gasket to maintain a seal. Bacterial contamination often breaches them from the outside, and fluids under high pressure can breach them from within.

Many existing connector designs have other problems as well. One issue which arises is the issue of cost. For every connection, at least two, and often three differently designed parts must be manufactured. For instance, many designs require that the connection be comprised of two halves having complementary designs such that they interlock or otherwise fit together to form the connection. As indicated above, such designs generally require the presence of a gasket to complete the seal. The gasket spans a space between the halves, nesting in a recess, generally annular, in the surface of each connector. Three different pieces are required for completion of the seal: a left connector, a right connector, and a gasket. In some designs, the connectors do not have a "handedness," designed instead such that the connection can be completed by two identical pieces. Such a design requires connector pieces and a gasket piece. Whether or not the connector halves are identical, a separate gasket is still generally required to complete the seal.

In order to efficiently form a seal between the rigid gasket and the connector piece, it is generally necessary that the gasket be of a deformable material or, if the gasket is of a rigid material, that a layer of deformable material be disposed over the surfaces of the gasket and/or within a retaining recess on the connector flange. One structural feature linked to the failure of gasket-containing connectors at high pressures or stringent aseptic conditions is the failure of the elastomeric gasket or deformable sealing layers between the gasket component and the connector pieces.

In order to elucidate the problem, it is necessary to have a degree of understanding of the mechanics of sealing and gasket failure. Many screw and other type connections move the connectors toward each other while rotating them about their cylindrical axes with respect to each other in order to form a seal. Thus rotation occurs while elastomeric surfaces are in contact, and further rotation increases the pressure between the surfaces, increasing the frictional forces between them, preventing them from slipping and relieving the stress introduced by rotation. As a result, upon completing the connection, the elastomeric components of the gasket, whether they comprise the entire gasket, or only a layer between a rigid gasket component and a flange, have "stored" energy in elastic deformation.

The axial components of the strain can be useful in forming the seal; deformation in the axial direction introduced by forcing sealing members together generally results in a countering, axially-directed urge within the elastomeric portions of the sealing assembly, enhancing sealing ability of the completed seal.

However, components of stress parallel to the surface of the sealing layer, such as circumferential and radial components, can be efficiently converted to axial pulls which 1) counteract the axial forces pressing the sealing components together and 2) result in pressure differentials across the surfaces of the seal, enabling the formation of channels between the interior and the exterior of the seal, through which breaches can occur.

One example of this type of conversion is caused by rotating, in opposite directions, two elastomeric faces which are pressed into mutual contact. The elastomeric face is part of an elastomeric disk which is immobilized at the contact face as well at as its anchoring face. Rotation causes the entire elastomeric disk to tend toward a slight flattening with increasing angular distance from the starting configuration. Ideally, the axial pull is uniform with angle and radius over the sealing surface, but in reality, even slight asymmetries due to manner of contacting to complete the seal, distribution of forces due to and during operation, forces due to external buffeting, and the like cause the pressure across the sealing surface to tend strongly toward nonuniformity, if not immediately upon sealing, upon operation. A contributing factor to such a failure is the storage of stresses (introduced upon, for example, completing the seal) in the gasket and connector sealing layers which cause the layers to deform such that the bias to return to their original configurations destroys the uniformity of contact pressure over the surfaces forming the seal interface. With a loss of uniformity, channeling, or the existence, transiently or permanently, of low pressure regions connecting the interior and the exterior of the seal, occurs.

Designs having closing strategies circumventing axial rotation (such as connector halves which are attached at an edge point such that they can be folded into mutual facing contact) also have the problem of the stored stresses counterproductive to sealing. The act of closing the halves over a gasket can result in stored stresses which are essentially unidirectional in the direction of closing. Such stresses can be expected to reduce the integrity of the seal, having circumferential as well as radial components, both of which are parallel to the surface of the sealing layer.

Furthermore, stresses which bend the cylindrical axis of the assembly at the seal redistribute pressure across the face of the seals and cause breaching. Such a scenario is particularly appropriate in situations in which the connectors are plastic and deformable, even slightly.

On the whole, each seal created by pressing together 1) two elastomeric surfaces or 2) an elastomeric and a non-elastomeric surface has associated with it a risk of failure due to channeling mechanisms. For this reason, the presence of elastomeric sealing surfaces is generally thought to raise the risk of breach.

A gasket-type connector with reduced susceptibility to failure would be an advance over the present state of connector art. Furthermore, a gasket-type connector additionally having the convenience of a rotation or axial push engagement would be even more desirable. Moreover, a genderless gasket connector in which the complete connection is simplified with respect to existing connectors in that it can be formed from two identical pieces would be welcomed by the industry.

DESCRIPTION OF THE INVENTION

Figure 1A:
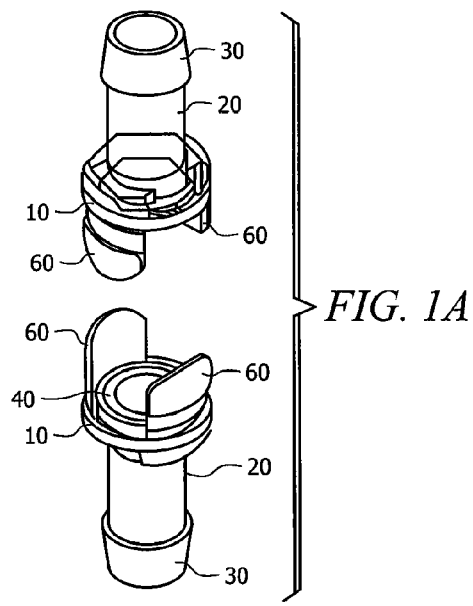
FIG. 1A is an exploded perspective view of a first embodiment of the novel connector.

It has been found that when a seal is formed from a gasket having two parts which interface elastomerically upon forming the seal, the seal can be efficiently completed, with the sealing efficacy surprisingly undiminished with respect to single gasket systems. The results are surprising because the introduction of another sealing plane would be expected to significantly increase the incidence of channeling and other breaching events. Furthermore, the use of a two-part gasket system enables the inclusion of a half gasket with each connector. A half gasket can be adhered, reversibly or irreversibly, into the annular groove of the respective connectors. In the situation in which the connectors are genderless, a split gasket enables one to complete a connection by purchasing two of one type of piece. Furthermore, it has been found that when connectors are fashioned of extrudable and/or moldable materials, such that they include an annular annex, according to the present invention, which is spatially continuous with an annular groove, the gasket form can be modified in such a way that not only does it adhere readily into the annular groove, but the sealing efficiency is often raised with respect to a connector/gasket assembly in the absence of the modification.

The sanitary assembly of the present invention comprises two connectors. Each connector comprises a face which comprises an annular groove. It is not essential that the face have planar sections, but in one embodiment, the face is a flange comprising an annular groove. Each face is associated with an annular gasket. In some embodiments, the annular gasket is made entirely of an elastomeric material. In other embodiments, the gasket is partially elastomeric, such as, for example, a gasket comprising a rigid core or layer which can be of a rigid plastic material; and an elastomeric layer on the upper and/or lower surfaces of the rigid core or layer. In yet other embodiments, the groove is fully or partially lined with an elastomeric layer, and the gasket surface area contacting the elastomeric surface of the liner is rigid.

The connector can comprise one or more materials, but in preferred embodiments, the connector is uniformly of one material. In a preferred embodiment, the connector is of one piece rigid plastic or polymer construction, and preferably molded, such as by injection or extrusion. Preferred materials include rigid polymeric materials including polymer blends. Materials comprising rigid polymers such as polycarbonates, polypropylene, and polyvinyl polymers such as polyvinyl chloride are preferred.

The gasket components can be entirely of an elastomeric material, or comprising both rigid and elastomeric materials. For example, the gasket components can comprise a rigid material with an elastomeric upper surface by which it contacts the corresponding surface of the remaining gasket required for a completed seal. In preferred embodiments, the gasket contacts the connector in an elastomeric layer, which, in different embodiments, can be 1) the surface of an elastomeric gasket, 2) as elastomeric material adhered to the surface of a rigid gasket component, 3) an elastomeric material adhered to a surface of the annular groove.

The gasket component is preferably shaped such that it comprises a surface which can be fittingly and sealingly received into the annular groove (a "lower" surface), as well as a surface which can sealingly contact the analogous surface on the additional gasket component required to complete the seal (the "upper" surface). By "fittingly received" is meant that the gasket either contacts approximately the entire surface of the annular groove upon insertion, or upon seal formation. In one embodiment, the annular groove has a rounded cross section, and the corresponding lower surface on the corresponding gasket is rounded. In another embodiment, the annular groove has an open polygonal cross section, such as rectangular, or quadrilateral wherein the open side is longer than the opposing side.

In one embodiment, the groove is lined with an annular annex (elucidated in further detail below) which extends from the face of the groove. In yet another embodiment, the connector is a single extruded or molded rigid plastic piece, with a further embodiment comprising an annular annex which is molded to have an approximately rectangular cross section, but which solidifies to have a tear drop or round-shaped cross section, and wherein the cross section has a necked, constricted section which leads into the groove. In a preferred embodiment, the gasket is annular with a rectangular cross section and comprises a rigid core or layer and an elastomeric layer on at least one surface, wherein the cross section of said elastomeric layer comprises an elastomeric "tail" or projection which is fittingly received by the annular annex. In other embodiments, the groove has an approximately round cross section except for an annular annex, and the gasket has an approximately round cross section except for an elastomeric tail, which is fittingly received by the annex.

It has been found that imperfections in the injection molding process can be exploited in order to (1) make possible the provision of a single type of sealing assembly which comprises a ready to use gasket, and 2) potentially improve the sealing ability of the gasket. The annular annex has dimensions generally has dimensions which are small compared to the dimensions of the rest of the sealing assembly. For example, cross sectional dimensions of the annular annex can be in the range of from about 0.1 to about 5.0 square millimeters or so, or even larger or smaller, such that the gasket member is retained in the annular groove by the residence of some or all of the annular projection in the annular annex. On such a size scale, surface tension effects can be influential in dictating final shape. For instance, while a molded piece may have an annular annex which has a 1 millimeter by 1 millimeter cross section immediately upon extrusion of other molding, such small dimensions can become curved during cooling or setting. Upon drying, curing or hardening, examination may reveal a circular, oval or tear drop-shaped cross section, optionally having a narrowed neck region which connects the annular annex to the annular groove. By including an annular projection having dimensions which are equal to or wider than the neck portion discussed above, gaskets can be influenced to sit securely in their respective annular grooves without falling out or dislodging. In the fabrication of the sealing assembly, it is necessary to coordinate the position of the projection with the position of the annular groove so that the projection is able to be situated in the groove without spontaneously popping free of the groove. The relative dimensions of the projection and the annex are such that the projection can slip through the neck and be retained by the annex. Projection profiles which facilitate such a fit include tapers in which the narrow end inserts first and the gasket is secured by further wedging the wide end of the taper through the neck. Other profiles include those in which the annular projection itself is connected to the gasket by a neck, and the entire projection seats into the annular annex, such as could be formed by passing a bead of elastomeric material around the circumference of the lower surface of the gasket component. In one embodiment, the gasket is wholly (including the projection) molded. In another embodiment, the projection is fabricated separately and attached to the gasket, or molded or otherwise fabricated such that attachment to the gasket occurs during fabrication of the projection.

Elastomeric materials which can be used in the sealing assembly of the present invention include polymeric materials known in the art for such uses. Non-limiting examples of appropriate polymeric materials include certain styrene block copolymers having block structure designations such as SEBS, SEPS, SEEPS, SEEBS, and the like. Other appropriate materials include materials comprising polyethylene, polypropylene, polybutylene, polymerized isoprene, and other materials comprising polymerized olefins. Polymeric materials such as SEPTON branded materials, KRATON branded materials, C-FLEX branded materials, Santoprene and the like can also be used. In general, polymeric materials and their gels and other derivatives which are known in the art for use in high pressure and/or aseptic sealing applications are appropriate to achieve the benefits of the present invention.

The sealing assembly of the present invention comprises two genderless connectors described herein, each having a gasket, described herein, which are connected face-to-face, wherein upon bringing the faces together, the gaskets meet in such a way as to inhibit further approach of the faces.

In a preferred embodiment, the genderless sealing assemblies do not require a clamp in order to complete the seal. In some preferred embodiments, the seal is completed by simply urging the faces together such that the surfaces of the gaskets meet.

In one example of such a connector, the axial pressure is directly generated by the person or machine forming the connection, in the absence of screw-type levering. Included are genderless connectors comprising at least two projections per sealing member which engage receiving areas on opposite flanges as the flange faces are pushed together. In some embodiments, the projections are of rigid plastic, bear at least one barb along their lengths, and have the ability to flex slightly as necessary for barb engagement. The projections alternate angularly about the sealing face with receiving areas. The projections on one flange engage the receiving areas on the second flange. The barbs point in a direction which is dictated by the requirement of locking with a receiving area. In one embodiment, the projections are spaced about the edge, and in a further embodiment, they engage recesses in the edge. In another, the projections are spaced at an inner radius, and they engage the interior of the face or additional projections from the face. In preferred embodiments, the sealing members are genderless (i.e., as mentioned above, they are identical in shape, yet they mate to form a complete connection). In a further preferred embodiment, the projections have bases which are designed to nest together upon completing the seal, forming a 360 degree buttress which protects the gasket between the flange faces from intrusions which reach between the flange faces.

In other embodiments, the axial pressure is at least partly generated by rotating the faces angularly with respect to each other. Engagements residing on the edges of the connectors or at radial positions greater than the radius of the gasket come into contact with and reversibly or irreversibly immobilize the flanges with respect to one another. In other embodiments, the faces are rotated with respect to each other, with engagement pressure increasing with degree of rotation.

Such sealing members can have projections which engage opposite flanges at receiving areas, which are designed such that upon rotation of the faces, the motion of the projections against the receiving area draws the faces together (refer to figures). As with the non-screw-type embodiments, the projections and their receiving areas can be angularly alternating with the receiving areas. In any of the above embodiments, the method of ensuring that the seal is not easily disengaged may comprise a barb mechanism (such as, for example a "snap" engagement) and/or a friction mechanism (such as, for example, of the type which causes a screw to resist extraction).

Examples of such seals include sealing assemblies in which the sealing members comprise more than one component. For example, the sealing member can comprise a "stem" component and a "collar" component (refer to figures). Generally, the stem component comprises a face and a hose attachment connection, such as, for example, a hose barb. It should be understood that the term "hose attachment connection" includes the methods of attaching hoses or other types of influx channels to the face component, including but not limited to injection molding, press fitting, welding and the like. The face bears an annular groove for seating a gasket. As in embodiments described above, the annular groove can be spatially continuous with an attached annular annex. In different embodiments, the stem comprises an ISO2852 or an ASME-BPE sanitary connection. The collar component is generally annular, sliding over the hose attachment component, but having a lip preventing it from passing over the face component of the stem. In preferred alternate embodiments, the stem and collar components function as both types of the sealing members elucidated above (direct pressure and rotational). In alternate embodiments, the collar and stem are proportioned such that the annular groove resides on the collar, rather than the face of the stem. In another embodiment, the collar additionally comprises an annular annex. A "backup" ring, such as that depicted in the figures, can be used between the collar component and the stem component of one or both connectors to increase the pressure at the gasket upon completing the connection.

In embodiments comprising a collar, the collar can comprise projections and receiving areas, such as described above, and the modes of completing the seal can comprise, as described above direct axial pressure or rotational engagement. Preferably, the projections and receiving areas are angularly spaced around the collar. In a preferred embodiment, the collar comprises 2, 3 or 4 projections and 2, 3 or 4 receiving areas. In an embodiment, the collars are rotated with respect to each other in order to fully engage the projections and the receiving areas, and upon engagement, the collars, and thus, the associated faces are pulled closer together. In one embodiment, the faces do not rotate with respect to each other with the rotation of the collars, or rotate only at the beginning of the rotation due to being immobilized with respect to each other by the friction of contact with the gasket components (which are in mutual contact), or in alternative embodiments, by the mechanical interference of projections from one or both faces. In one embodiment, the reversal of the rotation is prevented by the engagement of a barb on one or more projections. In still other embodiments, the seal is completed by contacting the projections with the associated receiving areas and forcing the faces closer together without rotation. In an additional embodiment, one or more of the projections bear one or more barbs which prevent automatic disengagement by requiring an action such as pinching the barbs inward, or in another embodiment, pushing the faces together and simultaneously rotating the faces. In general, each face or each collar contains receiving areas for projections from the collar or face of the opposite connector (a collar can have projections which associate with receiving areas on the opposite face, a face can have projections which associate with receiving areas on an opposite collar. In separate embodiments, the projections are barbed and they flex and catch against the opposite face or collar, and in other embodiments, the projections slip through the receiving areas in the opposite face or collar, but immobilization is achieved by rotation, optionally secured through a barb mechanism.

FIG. 1A depicts a connector according to the present invention comprising a face (10) and a stem (20), bearing a hose connection component (30) which, in the depicted embodiment, bears a hose barb. In other embodiments, the hose connection comprises a press fit by one of the methods known in the art, such as, for example, a connector comprising an inner extension which is inserted into the connecting end of the hose, and an outer ring or collar which secures the hose in position between itself and the inner extension. The connectors in the depicted embodiment comprises gasket elements (40) which are fittingly received into annular grooves (obscured by gasket elements) in the face of the connector. In the depicted embodiment, the connector further comprises receiving areas which receive the projections.

Figure 1B:
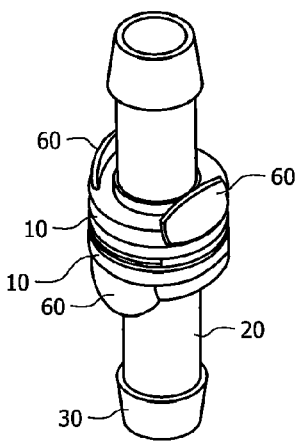
FIG. 1B is a perspective view of the first embodiment in its assembled configuration.

FIG. 1B depicts the connectors fully engaged, locked into position by the barbs (60). In the depicted embodiment, the barbs are tabs which can be pressed toward each other in order to reverse the connection.

Figure 1C:
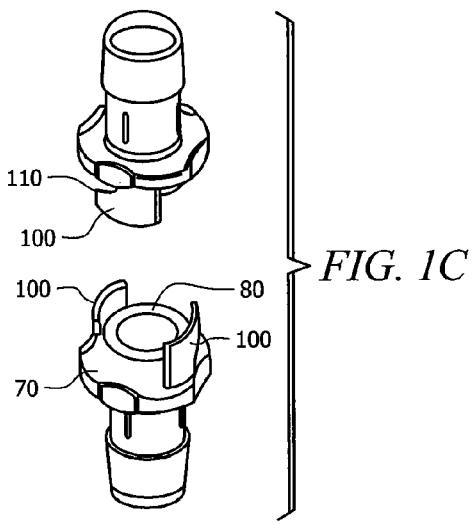
FIG. 1C is an exploded perspective view of a second embodiment of the novel connector.
Figure 1D:
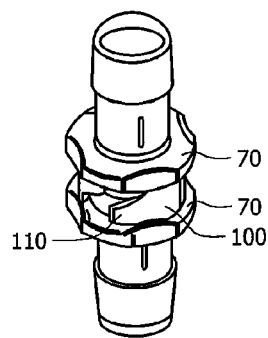
FIG. 1D is a perspective view of the second embodiment in its assembled configuration but prior to rotation.
Figure 1E:
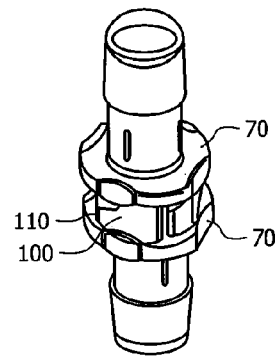
FIG. 1E is a perspective view of the second embodiment in its assembled configuration after rotation.

FIG. 1C depicts yet another embodiment which is similar to that shown in FIGS. 1A and B, but in which the connection is completed by rotation. In the depicted embodiment, the faces (70), each of which have a gasket element (80) fittingly received within annular grooves (obscured by gasket elements) in the faces, bear, at a radius which is exterior to the gasket elements, projections (tabs) (100) spaced such that, during formation of the connection, they are pushed together in staggered fashion (FIG. 1D), and then rotated into contact (FIG. 1E), which is preferably secured by the presence of a barbed portion borne at the tab ends (110). In different embodiments, the positioning of the tabs is preferably guided by either the unrecessed portion of the gasket or a thin annular wall at a radius between the outside of the gasket and the inner wall of the tabs. In one embodiment, not illustrated, the faces bear recesses or slots such that the tabs partially or fully penetrate the faces, and upon rotation, form the connection. Note that in order for the connection to be made, the gasket elements must be under some degree of positive pressure upon locking of the tabs, and preferably, during formation of the seals.

Figure 1F:
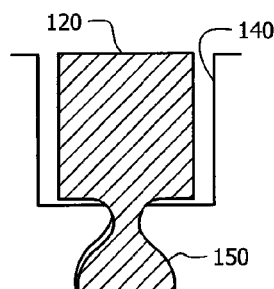
FIG. 1F is a cross-sectional view of a gasket member having an annular projection.

FIG. 1F shows a cross section of the embodiment in which the gasket is held in place by an elastomeric annular projection extending from an elastomeric gasket face, and which is inserted into an annular annex which is spatially continuous with an annular groove. The figure depicts a gasket member (120) bearing an annular projection (130) seated in an annular groove (140) where the annular projection is retained by the elastomeric force of deformation in the annular annex (150).

Figure 2A:
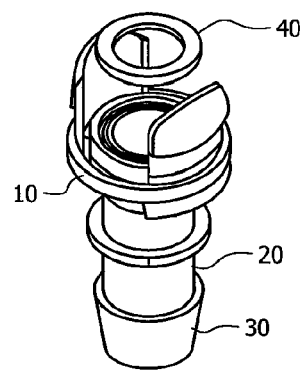
FIG. 2A is an exploded perspective view of a sanitary gasket.
Figure 2C:
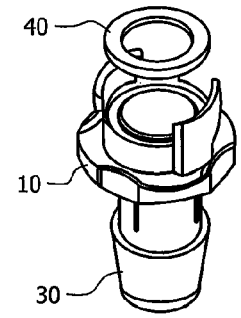
FIG. 2C is an exploded perspective view of a sanitary gasket.
Figure 2B:
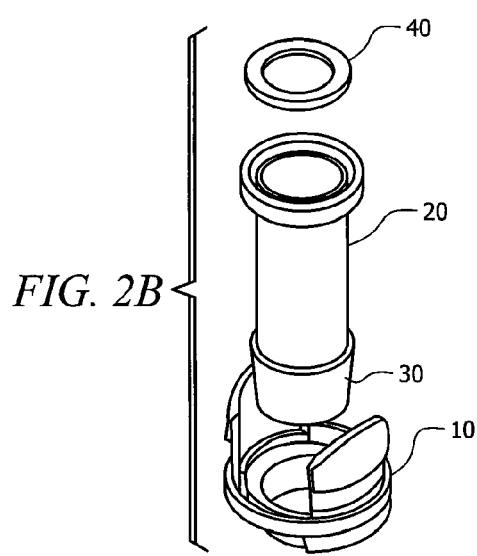
FIG. 2B is an exploded perspective view of an axial pressure embodiment.
Figure 2D:
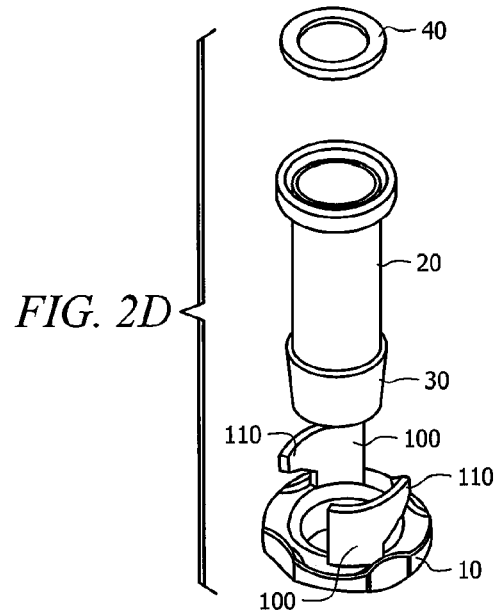
FIG. 2D is an exploded perspective view of a rotary embodiment.

In FIGS. 2a and 2c, sanitary gasket and annular recesses are depicted. In FIGS. 2b and 2d, axial pressure and rotary embodiments, respectively, comprising a stem component, a collar component, and a gasket component are depicted. The face of the stem bears an annular groove for fittingly receiving the gasket component, which, once seated, will extend above the face surface such that upon completing the seal, the sealing surface of the gasket components are under positive pressure.

Figure 3A:
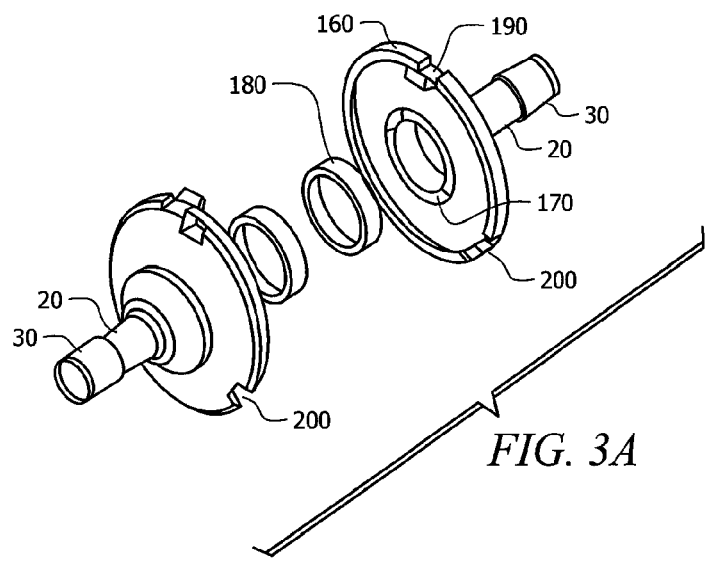
FIG. 3A is an exploded view of a connector assembly.
Figure 3B:
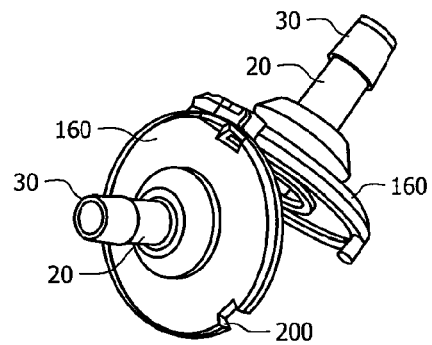
FIG. 3B is a perspective view of the FIG. 3A embodiment, depicting the first step to completing a seal.
Figure 3C:
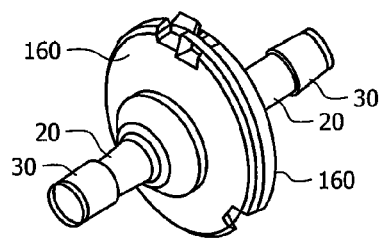
FIG. 3C is a perspective view of the FIG. 3A embodiment, depicting the complete connection.

FIG. 3A depicts a connector assembly comprising two connectors having flange faces (160) and annular grooves (170) into which are fittingly received gasket elements (180), shown. The flanges bear mutually interlocking edge projections (190), as well as projections which have a one-way interlock (200), such that the connector pieces are identical in shape. FIG. 3B depicts the first step to completing the seal, comprising engaging the mutually interlocking tabs. FIG. 3C depicts the complete connection, with the one-way interlocks engaged. While not shown, the one way interlocks snap engage, such that the connection is not easily disrupted. The far projection, while present, is occluded in all three drawings.

Figure 4A:
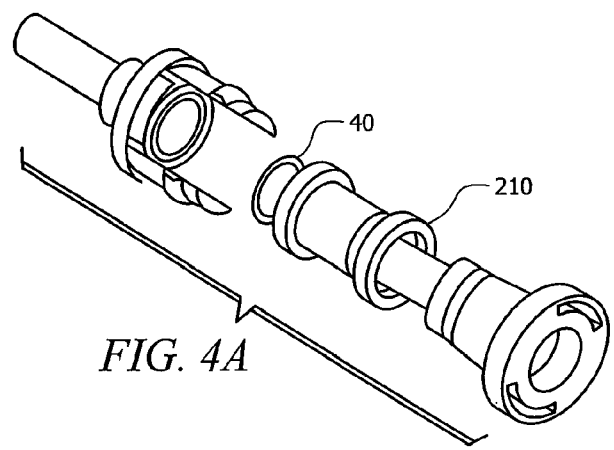
FIG. 4A is an exploded perspective view depicting the use of a backup ring and collar components that are not identical to form a seal.
Figure 4B:
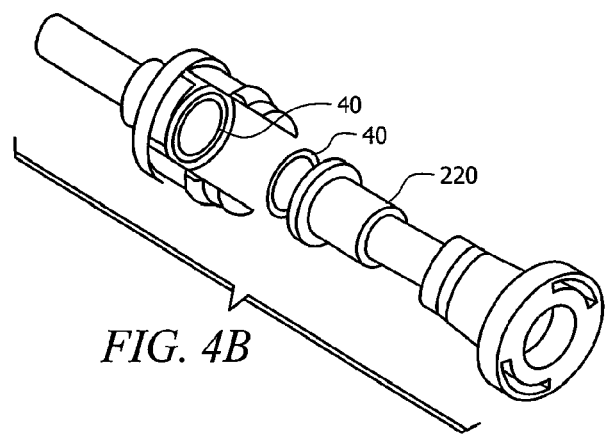
FIG. 4B is an exploded perspective view depicting the absence of a backup ring and collar components that are not identical to form a seal.

FIGS. 4A and 4B depict the use and absence, (210) and (220) respectively, of a backup ring, as well as collar components which are not identical used to form one seal.

It should be fully understood that variations of the foregoing disclosure not explicitly described above can be within the spirit of the present invention. For example, connectors comprising sealing members which are not genderless, but which form sealing assemblies comprising two or more stacked gaskets, optionally having different thicknesses are also within the ambit of the present invention. In another example, the present invention includes sealing assemblies in which the gasket bears a projection which nests into a sealing annex on a sealing member, inclusive of assemblies requiring only one gasket for sealing.

The invention claimed is:
1. A sealing assembly, comprising:
 a first sealing member having a hose component and a connector component in axial alignment with one another along a common axis of symmetry;
 said connector component having a diameter greater than said hose component;
 an annular groove formed in said connector component on a side thereof opposite from said hose component;
 an annular gasket disposed in said annular groove;

said annular groove and said annular gasket being concentric with one another and with said axis of symmetry;

a pair of flexible tabs formed integrally with said connector component, a first tab of said pair of flexible tabs being disposed in diametrically opposed relation to a second tab of said pair, said first and second tabs of said pair of flexible tabs being positioned radially outwardly of said annular groove;

a second sealing member having a hose component and a connector component in axial alignment with one another;

said connector component of said second sealing member having a diameter greater than said hose component of said second sealing member;

an annular groove formed in said connector component of said second sealing member on a side thereof opposite from said hose component of said second sealing member;

an annular gasket disposed in said annular groove of said connector component of said second sealing member;

said annular groove of said connector component of said second sealing member and said annular gasket disposed in said annular groove of said connector component of said second sealing member being concentric with one another and with said axis of symmetry;

a pair of flexible tabs formed integrally with said connector component of said second sealing member, a first tab of said pair of flexible tabs formed integrally with said connector component of said second sealing member being disposed in diametrically opposed relation to a second tab of said pair of flexible tabs formed integrally with said connector component of said second sealing member, said first and second tabs formed integrally with said connector component of said second sealing member being positioned radially outwardly of said annular groove of said connector component of said second sealing member;

said first and second sealing members being disposed in abutting relation to one another when said pair of tabs formed integrally with said connector component of said first sealing member engages said connector component of said second sealing member and said pair of tabs formed integrally with said connector component of said second sealing member engages said connector component of said first sealing member;

said annular gasket disposed in said annular groove formed in said connector component of said first sealing member abutting said annular gasket disposed in said annular groove formed in said connector component of said second sealing member in a face-to-face confronting relationship when said pair of tabs formed integrally with said connector component of said first sealing member engages said connector component of said second sealing member and said pair of tabs formed integrally with said connector component of said second sealing member engages said connector component of said first sealing member; and said connector components of said first and second sealing members engaging one another when displaced toward one another along said axis of symmetry, each tab of said pair of tabs formed integrally with said connector component of said first sealing member momentarily flexing radially outwardly when engaging said connector component of said second sealing member and flexing radially inwardly under an inherent bias to a position of repose after engaging said connector component of said second sealing member and each tab of said pair of tabs formed integrally with said connector component of said second sealing member momentarily flexing radially outwardly when engaging said connector component of said first sealing member and flexing radially inwardly under an inherent bias to a position of repose after engaging said connector component of said first sealing member.

2. The sealing assembly of claim 1, further comprising:
said annular groove formed in said connector component of said first sealing member having a depth less than a thickness of said annular gasket disposed in said annular groove formed in said connector component of said first sealing member.

3. The sealing assembly of claim 2, further comprising:
said annular groove formed in said connector component of said second sealing member having a depth less than a thickness of said annular gasket disposed in said annular groove formed in said connector component of said second sealing member.

4. The sealing assembly of claim 3, further comprising:
said tabs of said pair of tabs formed integrally with said connector component of said first sealing member having an arcuate configuration that extends circumferentially along ninety degrees of a circumference of said connector component of said first sealing member and said tabs of said pair of tabs formed integrally with said connector component of said first sealing member being circumferentially spaced apart from one another by ninety degrees.

5. The sealing assembly of claim 4, further comprising:
said tabs of said pair of tabs formed integrally with said connector component of said second sealing member having an arcuate configuration that extends circumferentially along ninety degrees of a circumference of said connector component of said second sealing member and said tabs of said pair of tabs formed integrally with said connector component of said second sealing member being circumferentially spaced apart from one another by ninety degrees.

\* \* \* \* \*